United States Patent

Bonta et al.

[11] Patent Number: 5,913,167
[45] Date of Patent: Jun. 15, 1999

[54] METHOD FOR TRANSFERRING A COMMUNICATION LINK IN A WIRELESS COMMUNICATION SYSTEM

[75] Inventors: Jeffrey D. Bonta, Arlington Heights; Stephen L. Spear, Skokie, both of Ill.

[73] Assignee: Motorola, Inc., Schaumburg, Ill.

[21] Appl. No.: 08/810,323

[22] Filed: Feb. 28, 1997

[51] Int. Cl.⁶ .................................................. H04B 7/26
[52] U.S. Cl. ........................ 455/436; 455/438; 455/453
[58] Field of Search .................................. 455/436, 437, 455/438, 439, 453, 432, 524, 525, 442, 443; 370/331, 332, 333

[56] References Cited

U.S. PATENT DOCUMENTS

| | | | |
|---|---|---|---|
| 4,698,839 | 10/1987 | DeVaney et al. | 379/60 |
| 4,811,380 | 3/1989 | Spear. | |
| 5,081,671 | 1/1992 | Raith et al. | |
| 5,146,609 | 9/1992 | Tayloe et al. | 455/63 |
| 5,175,867 | 12/1992 | Wejke et al. | 455/438 |
| 5,200,957 | 4/1993 | Dahlin | 455/437 |
| 5,280,630 | 1/1994 | Wang | 455/452 |
| 5,289,525 | 2/1994 | Issenmann et al. | 370/331 |
| 5,448,750 | 9/1995 | Eriksson et al. | 455/452 |
| 5,513,380 | 4/1996 | Ivanov et al. | 455/441 |
| 5,530,912 | 6/1996 | Agrawal et al. | 455/436 |
| 5,640,414 | 6/1997 | Blakeney, II et al. | 370/332 |
| 5,640,679 | 6/1997 | Lundqvist et al. | 455/436 |
| 5,710,585 | 1/1998 | Kallin et al. | 455/524 |
| 5,711,003 | 1/1998 | Dupuy | 455/436 |
| 5,722,072 | 2/1998 | Crichton et al. | 455/525 |
| 5,749,055 | 5/1998 | Dahlin | 455/453 |

*Primary Examiner*—Thanh Cong Le
*Attorney, Agent, or Firm*—Sayed Hossain Beladi

[57] ABSTRACT

A wireless communication system, including a first fixed communication unit and a second fixed communication unit, a mobile communication unit responsive to the first fixed communication unit and the second fixed communication unit, a method for transferring a communication signal associated with the mobile communication unit from the first fixed communication unit to the second fixed communication unit, the method comprising the steps of establishing the communication signal between the first fixed communication unit and the mobile communication unit; and sending a list to the mobile communication unit, the list comprising a reserved traffic channel associated with the second fixed communication unit, the mobile communication unit establishing communication with the second fixed communication unit over the reserved traffic channel when the communication signal is interrupted.

9 Claims, 1 Drawing Sheet

METHOD FOR TRANSFERRING A COMMUNICATION LINK IN A WIRELESS COMMUNICATION SYSTEM

FIELD OF THE INVENTION

The present invention relates generally to wireless communication systems and, more particularly, to a method for transferring a communication signal from a first fixed communication unit to a second fixed communication unit in a wireless communication system.

BACKGROUND OF THE INVENTION

In a cellular communication system, a communication link via an RF channel is established between a mobile station, or subscriber, and a source base station. As a mobile station moves out of range of the source base station, the signal quality will degrade until the communication link would ultimately be broken, or the call "dropped". To avoid loss of the communication link resulting from a dropped call, the communication link is shifted from the source base station to a target base station. This process of making the shift is commonly referred to in the cellular communication area as a handover process.

A handover can be defined as a change of channel during a call, either because of degradation of the quality of the RF channel which includes, power level or communication link quality below a certain threshold, or because of the availability of another channel which can allow communication at a lower transmit power, or to prevent a mobile station from grossly exceeding the planned base station boundaries. A handover may occur during a call in progress (e.g. from a traffic channel to a traffic channel), or during the initial signaling during call set-up. The handover may be either from a channel on the source base site to another channel on a target base site or between channels on the source base site.

In digital cellular systems—such as time division multiple access (TDMA) and code division multiple access (CDMA) systems, a mobile assisted handoff (MAHO) process is utilized. In MAHO, the mobile station is provided with a list of candidate base stations. At intermittent times, the mobile will measure a signal quality parameter of transmissions from the listed base stations. The quality parameter may be signal strength, or an other appropriate parameter such as energy per chip per total noise (EC/Io), bit error rate (BER), frame erasure rate (FER), or color code. These measurements are gathered to determine a preferred list of target base stations to which handover may be directed.

Despite handover capability, communication link failure followed by a dropped call, may happen when the signal-to-noise (S/N) level drops quickly in either a link from the mobile unit to the base station, or vice versa, resulting in the mobile unit's inability to detect handover commands. In wireless communication systems, dropped calls adversely affect overall system performance. Dropped calls cause irritation to the end customers and a loss of revenue to the wireless communication system operator. Microcellular system configurations may be particularly susceptible to dropped calls since increased reuse of traffic channel frequencies contributes to a higher level of co-channel and adjacent channel interference. In many dropped call cases, the drop could be avoided if base stations that serve the call could maintain communication with the mobile unit long enough to deliver handover instructions which could instruct the mobile unit to tune to a new channel at a target base station. Once the source base station controller realizes that the communication is in danger of being lost, however, it is often too late to deliver handover instructions, with associated handover parameters, to the mobile unit.

Therefore, a need exists for an improved method for transferring a communication signal from a first fixed communication unit, or source base station, to a second fixed communication unit, or target base station, in a wireless communication system.

SUMMARY OF THE INVENTION

According to an aspect of the present invention, the foregoing need is addressed by a method, which operates in a wireless communication system including a first fixed communication unit, a second fixed communication unit and a mobile communication unit responsive to the first fixed communication unit and the second fixed communication unit, for transferring a communication signal associated with the mobile communication unit from the first fixed communication unit to the second fixed communication unit. The method includes establishing the communication signal between the first fixed communication unit and the mobile communication unit; and sending a list to the mobile communication unit, the list having a reserved traffic channel associated with the second fixed communication unit, and the mobile communication unit establishing communication with the second fixed communication unit over the reserved traffic channel when the communication signal is interrupted.

According to another aspect of the present invention, the foregoing need is also addressed by method, which operates in a wireless communication system including a first fixed communication unit, a second fixed communication unit and a mobile communication unit responsive to the first fixed communication unit and the second fixed communication unit, for transferring a communication signal associated with a mobile communication unit from a first fixed communication unit to a second fixed communication unit. The method includes the mobile communication unit establishing the communication signal with the first fixed communication unit; the mobile communication unit receiving from the first fixed communication unit a list comprising a reserved traffic channel associated with at least a second fixed communication unit; the mobile communication unit detecting an interruption to the communication signal; after detecting the interruption, the mobile communication unit monitoring an interval; based on the monitored interval, the mobile communication unit selecting the reserved traffic channel from the list; after selecting the reserved traffic channel, the mobile communication unit tuning to the reserved traffic channel associated with the second fixed communication unit; and the mobile communication unit establishing the communication signal with the second fixed communication unit via the reserved traffic channel.

According to a further aspect of the present invention, the foregoing need is also addressed by method which operates in a wireless communication system including a source base station, a target base station, and a mobile communication unit responsive to the source base station and the target base station, for transferring a communication signal associated with the mobile communication unit from the source base station to the target base station. The method includes establishing the communication signal between the source base station and the mobile communication unit; sending a list to the mobile communication unit, the list including at least one reserved traffic channel associated with the target base station; detecting an interruption to the communication signal; monitoring an interval from the beginning of the interruption to the communication signal; and selecting the reserved traffic channel, the mobile communication unit tuning to the reserved traffic channel when the interval reaches a pre-determined limit.

DETAILED DESCRIPTION OF THE PREFERRED EMBODIMENT

Figure 1:
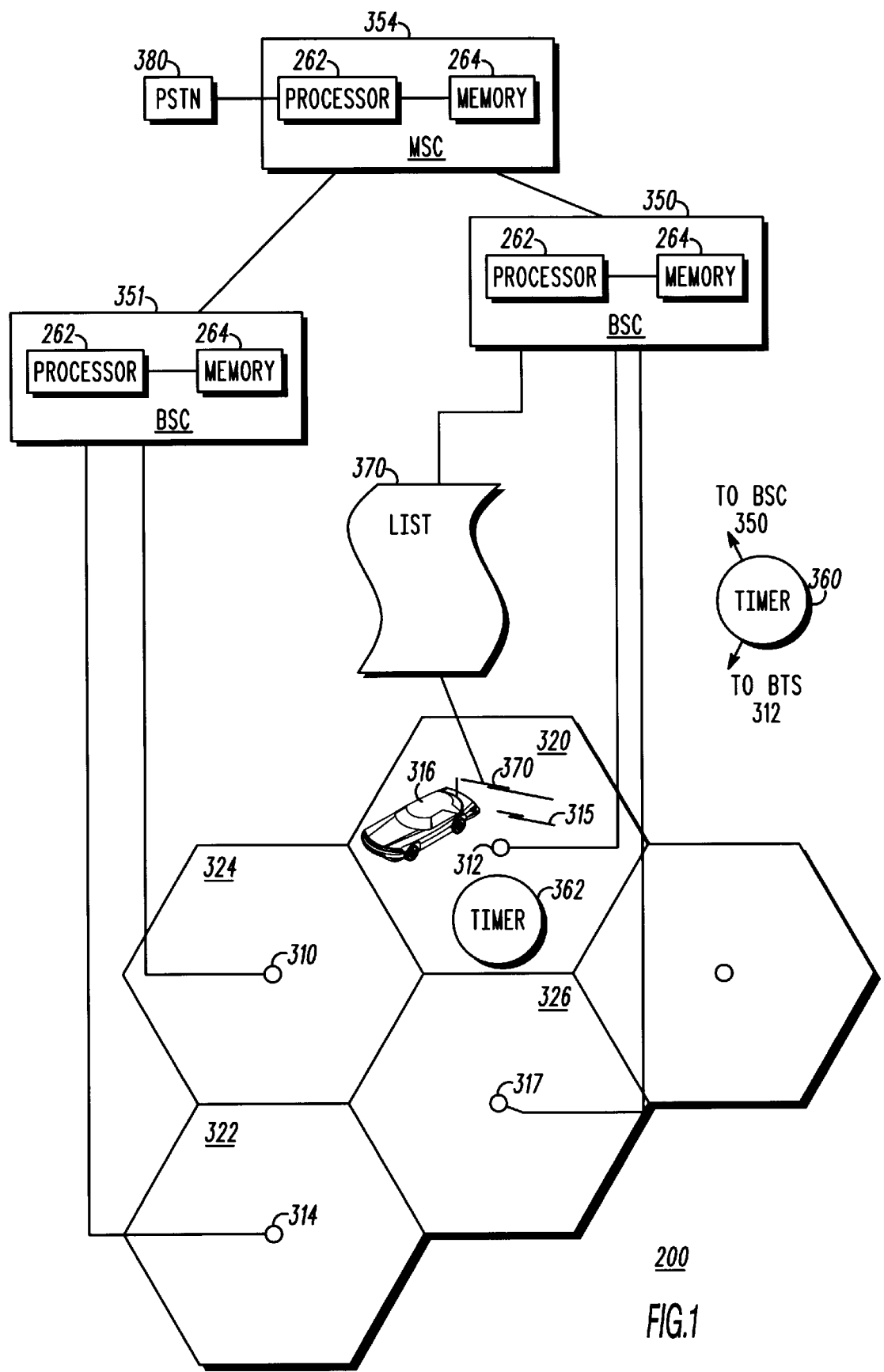
FIG. 1 is a diagram of a wireless communication system according to a preferred embodiment the present invention.

Turning now to the drawings, wherein like numerals designate like components, FIG. 1 illustrates a wireless communication system 200, such as time division multiple access (TDMA) digital radiotelephone system. One such system is described in Global System for Mobile Communication (GSM), incorporated herein by reference.

Fixed communication units such as base transceiver stations (BTS) 310, 312, 314 and 317 communicate with a mobile station 316, also referred to as a mobile unit, operating in within area 320. Areas 322 and 324 are served by BTSs 314 and 310, respectively while areas 320 and 326 are served by BTSs 312 and 317 respectively. BTSs 310 and 314 are coupled to a base station controller (BSC), 351, which includes, among other things, a processor 262 and a memory 264, and which is in turn coupled to a mobile switching center (MSC) 354, also including a processor 262 and a memory 264. Similarly, BTSs 312 and 317 are coupled to BSC 350 which includes, among other things, a processor 262 and a memory 264 which in turn is coupled to MSC 354. BSC 350 is in communication with BSC 351 via MSC 354. BTSs 310, 312, 314, 317, and BSC 350 and 351 may be referred to as a base station system (BSS). A BSS may also be defined as a single BSC and its associated BTSs. BSS MSC 354 is coupled to public switched telephone network (PSTN) 380.

Wireless communication between BTSs 310, 312, 314, and 317 and mobile station 316 occurs via radio frequency (RF) channels which provide physical paths over which digital communication signals such as voice and data are transmitted. Base-to-mobile station communications are said to occur on a down-link channel, while mobile-to-base station communications are referred to as being on an up-link channel.

As shown in FIG. 1, a communication signal, 313 has been transmitted on a down-link channel such as a traffic channel, by base station 312 to mobile station 316. Additionally, a communication signal 315, has been transmitted on an up-link channel such as a traffic channel by mobile station 316 in response to communication signal 313 from base station 312.

Wireless communication system 200 provides a number of logical channels (not shown) which are separated into two categories, traffic channels and signaling channels. The traffic channels are intended to carry encoded speech and data. The signaling channels are intended for carrying signaling information for circuit switching, mobile management, or channel configuration management, and include broadcast control channels, common control channels, and dedicated control channels which are defined as point-to-point bi-directional control channels.

The dedicated control channels (DCCH) can be further broken down into various types, based upon their bit rates, such as the stand-alone DCCH (SDCCH) whose allocation is not linked to a traffic channel, and the slow associated control channel (SACCH) which is allocated in conduction with a traffic channel. The control channels are primarily used to provide active mobile stations with a continuous means of communicating across the base-station-to-mobile-unit interface.

The downlink SACCH messages include, among other things, information to mobile units for the power level to be used to maintain the quality of the communication links (RF power control) and ordered timing advance. The up-link SACCH contains the actual mobile stations' power level, as well as the actual timing advance.

Any change of channel, including handover, associated with communication signals 313 or 315, is coordinated by BSC 350 based on measurements (not shown) provided by BTS 312. These measurements are sent on a continuous basis by mobile station 316 via the SACCH associated with the traffic channel on the up-link communication signal 315 between mobile station 316 and BTS 312. When BSC 350 determines that handover of mobile station 316 may be required, it sends handover instructions (not shown) to mobile station 316 via down-link communication signal 313. The handover instructions generally include a Handover Command which contains a target channel with associated channel characteristics as well as other handover information. Mobile station 316 uses the handover instructions to handover its communication signal(s), for example 313 and 315, from BTS 312 to a target base station such as 310, handover execution being well know in the art.

Under nominal conditions, the integrity on the down-link and up-link channels is maintained long enough to facilitate normal handover of communication signals 313 and 315 associated with mobile station 316 to a new channel, for example, from a channel associated with base transceiver station 312 to a channel associated with base transceiver station 310. However, there may be periods of sustained communication link interruption. Thus, if BTS 312 attempts to send handover instructions such as a Handover Command, to mobile station 316, the command may fail to reach mobile station 316 due to a systemized interruption In general, the parameters that govern the failure of down-link and up-link channels, are set such that release of a channel will not nominally occur until the call has degraded to a quality below that which mobile station 316 would have released the channels. Thus, until the forced release occurs, the mobile continues to transmit on the up-link channel.

In a preferred embodiment of the present invention, upon allocation of a channel, including a down-link channel (not shown) associated with communication signal 313 and an up-link channel (not shown) associated with communication signal 315, between BTS 312 and mobile communication unit 316, a list 370 is provided to mobile communication unit 316 by BTS 312. List 370 is composed of reserved traffic channels associated with neighboring BTSs such as BTSs 310, 314 and 317.

List 370, may be initially provided by BSC 350 to BTS 312, which sends it to mobile unit 316 on an as needed or asynchronous basis via the down-link SACCH associated with the traffic channel conveying communication signal 313. List 370 may provide the identity of "source" BTS 312 as well as the identity of reserved traffic channels associated with candidate target BTSs such as 314, 317 and 310.

Mobile station 316 retains list 370 to be used if an inadvertent loss of a communication link or signal, occurs between mobile station 316 and BTS 312. In the event of an inadvertent loss of communication signal 313 associated with the down-link channel between BTS 312 and mobile station 316, mobile station 316 may select a reserved traffic channel from list 370, the reserved traffic channel associated with a target base station such as BTS 310.

As mobile unit 316 moves through wireless communication system 200, list 370 is updated to reflect desired neighboring BTSs as well as potential reserved traffic channels associated with the preferred neighboring BTSs. The preferred neighboring BTSs are, typically a subset of neighbor BTSs proximate to a source BTS such as BTS 312. Therefore each BTS has a list of neighboring BTSs as well as a corresponding list of reserved traffic channels associated with each of the neighboring BTSs. List 370 is periodically or asynchronously updated as the channel reservations change. When mobile 316 is assigned a new source BTS, or when a reservation update occurs which relates to mobile station 316 list of preferred neighbors, a unique message (not shown) is sent to mobile station 316. The unique message may be carried on the down-link channel and serves to provide mobile station 316 with list 370 as well as the unique identity descubing the call connection of it's current source BTS.

In an alternate embodiment, the list may be composed of the same traffic channels reserved in all BTS's, or a single traffic channel consistently reserved in each BTS, the reserved channels allocated to receive the transferred communication signal from a source BTS, when the communication signal is in jeopardy of dropping as described above.

The reserved traffic channels could be allocated by the base station system or the MSC in order to provide mobile stations with alternate communication channels in the event of an inadvertent loss of the communication signal with a source base station.

In the event of a communication link interruption to mobile station 316 communication signals 313 or 315 on the down-link or up-link channels, respectively, actions may be taken by the base station system and/or mobile station 316 to mitigate a dropped call.

In the case of the communication link interruption being detected by the base station system, BSC 350 may notify candidate target BTSs 310, 317 and 314 via base station controllers 350 or 351, to enable or key-up according to well known methods, their reserved traffic channels included on list 370. The direction to key-up reserved traffic channels in anticipation of receiving the communication signal associated with mobile unit 316 may occur at the first sign of a significant interruption to communication signal 315 or, after a predetermined time following the first sign of a significant interruption to communication signal 315, the predetermined time allowing for possible signal recovery. The significant signal interruption to communication signal 315, could include, for example, an inability to decode SACCH frames on the up-link and/or downlink, or a signal-to-noise ratio which falls below a predetermined threshold.

The period of time between the first sign of a significant interruption to communication signal 315 associated with the up-link, and the subsequent transfer of communication signal 315 to a target BTS such as BTS 310, may be monitored by a timer 360. Timer 360 may be located in BTS 312 or BSC 350, the construction and operation of suitable timers being well known in the art. It is contemplated that timer 360 may be implemented in software or hardware.

In the case of the communication link interruption being detected by mobile station 316 via the down-link channel associated with communication signal 313, mobile station 316 monitors an interval beginning with the first sign of a significant signal interruption. The interval is monitored using a timer, such as timer 362, implemented according to well-known methods i n hardware or software. After a predetermined period of time, mobile station 316 initiates the transfer of communication signal 313, from BTS 312 to the preferred neighbor BTS having a keyed-up reserved traffic channel selected from list 370. Mobile station 316 tunes to the selected reserved traffic channel frequency and timeslot to establish a connection. If a connection cannot be established on the first attempt, mobile station 316 will try tuning to other reserved traffic channel(s) associated with a subset of preferred neighboring BTS's. It should be noted that the predetermined period of time associated with timer 362 may be selected so as to prevent premature transfer of communication signal 313 from a source BTS such as BTS 312 to a target BTS such as BTS 310.

When the transfer of communication signal 313 from BTS 312 to BTS 310 or another unique call identifier is successfully completed, mobile unit 316 will transmit the unique identity of BTS 312 to BTS 310. BTS 310 will initiate, the tear down implemented according to methods well-known in the art.

In a alternate embodiment, reserved traffic channels are permanently keyed-up at each BTS when communication system 200 is enabled. Consequently, as soon as mobile unit 316 experiences a significant signal interruption, with or without signaling from BTS 312, it is able to capture a reserved traffic channel, and handover communication signal 313 after a predetermined time. For example, in a TDMA system, a BCCH could be used for the reserved traffic channel since this channel is keyed up anyway.

The Global System for Mobile Communication (GSM), a TDMA system has been specifically referred to herein, but the present invention is applicable to any digital system, including but not limited to all TDMA systems such as, Personal Digital Cellular (PDC), a Japanese TDMA system, and Interim standard 54 (IS-54), a U. S. TDMA system, and Interim Standard 95A (IS 95A), a CDMA system.

The principles of the present invention which apply to a cellular-based digital communication system also apply to other types of communication systems, including but not limited to personal communication systems, trunked systems, satellite systems and data networks. Likewise, the principles of the present invention which apply to all types of digital radio frequency channels also apply to other types of communication channels, such as electronic data buses, wireline channels, optical fiber links and satellite links.

It will furthermore be apparent that other forms of the invention, and embodiments other than the specific embodiments described above, may be devised without departing from the spirit and scope of the appended claims and their equivalents, and therefore it is intended that the scope of this invention will only be governed by the following claims and their equivalents.

What we claim is:

1. In a wireless communication system, comprising a first fixed communication unit and a second fixed communication unit, a mobile communication unit responsive to the first fixed communication unit and the second fixed communication unit, and the mobile communication unit in a communication link with the first fixed communication unit, a method for transferring the communication link from the first fixed communication unit to the second fixed communication unit, the method comprising the steps of:

sending a predefined list of at least one reserved traffic channel associated with the second fixed communication unit, the second fixed communication unit having a plurality of traffic channels, wherein, other than the least one reserved traffic channel, the plurality of traffic channels are available for common use by a plurality of the mobile communication units having access to at least one of the first or second fixed communication units;

detecting interruption of the communication link with the first fixed communication unit before securing a new communication channel for continuing the communication link; and establishing communication with the second fixed communication unit over the least one reserved traffic channel after said detecting step for continuing the interrupted communication link.

2. The method as recited in claim 1 wherein said detecting interruption of the communication link involves detecting a dropped call.

3. The method as recited in claim 1 further comprising the steps of:

communicating a result of the step of detecting interruption of the communication link to the second fixed communication unit;

keying-up the least one reserved traffic channel in the second fixed communication unit when detecting interruption of the communication link.

4. The method as recited in claim 1 further comprising the step of delaying the step of establishing communication with the second fixed communication unit over the least one reserved traffic channel for recovery of the interrupted communication link.

5. The method as recited in claim 1 further comprising the step of repeating establishing communication with the second fixed communication unit over one other the least one reserved traffic channel after said detecting step for continuing the interrupted communication link.

6. The method according to claim 1 wherein the detecting interruption of the communication link is based on a parameter selected from the group consisting of: a loss of at least a portion of the communication signal, a loss of detection of a message, and a signal-to-noise level drop below a predetermined threshold.

7. The method according to claim 1, further comprising the steps of:

setting a timer in the mobile communication unit upon first noting the detecting interruption of the communication link;

monitoring an interval from the beginning of the interruption;

tuning to the least one reserved traffic channel based on the monitored time interval; and establishing communication with the second fixed communication unit over the least one reserved traffic channel when the interval reaches a predetermined limit.

8. The method according to claim 1, further comprising the steps of:

setting a timer in the first communication unit upon first detecting interruption of the communication link;

monitoring an interval from the beginning of the interruption to the communication signal;

the first fixed communication unit, based on the monitored interval, notifying the second fixed communication unit to receive the communication signal;

establishing communication with the second fixed communication unit over the least one reserved traffic channel when the interval reaches a predetermined limit.

9. The method according to claim 1, further comprising the step of:

after establishing communication with the mobile communication unit, the second fixed communication unit notifying the first fixed communication unit to drop the communication signal.

* * * * *